US006678338B1

(12) United States Patent
Noguet et al.

(10) Patent No.: US 6,678,338 B1
(45) Date of Patent: Jan. 13, 2004

(54) RECEIVER MODULE AND RECEIVER FORMED FROM SEVERAL CASCADED MODULES

(75) Inventors: Dominique Noguet, Grenoble (FR);
Jean-René Lequepeys, Fontaine (FR);
Didier Lattard, Rencurel (FR);
Norbert Daniele, Montbonnot (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/538,511

(22) Filed: Mar. 30, 2000

(30) Foreign Application Priority Data

Apr. 2, 1999 (FR) .............................................. 99 04172

(51) Int. Cl.[7] .............................. H03D 3/22; H04L 27/22
(52) U.S. Cl. ......................................... 375/330; 375/152
(58) Field of Search ................................. 375/152, 150, 375/143, 142, 329, 330

(56) References Cited

U.S. PATENT DOCUMENTS

| 5,583,884 A | | 12/1996 | Maruyama et al. | |
|---|---|---|---|---|
| 5,799,035 A | * | 8/1998 | Lattard et al. | 375/152 |
| 6,335,947 B1 | * | 1/2002 | Lattard et al. | 375/142 |

* cited by examiner

*Primary Examiner*—Chi Pham
*Assistant Examiner*—Demetria Williams
(74) *Attorney, Agent, or Firm*—Oblon, Spivak, McClelland, Maier & Neustadt, P.C.

(57) ABSTRACT

Receiver module and receiver formed from several cascaded modules. The module comprises inputs (E1, E2, E3, E4) and outputs (S1, S2, S3, S4) connected to selection means (44), to switching means (45) and to decoding means (46, 58, 60). Such modules can be cascaded by simply connecting the corresponding inputs and outputs. The final module delivers the transmitted information. Application to differential phase modulation and orthogonal modulation spread spectrum digital transmission.

3 Claims, 4 Drawing Sheets

RECEIVER MODULE AND RECEIVER FORMED FROM SEVERAL CASCADED MODULES

TECHNICAL FIELD

The present invention relates to a receiver module and to a receiver formed from several cascaded modules.

The invention has a general application in digital communications and in particular in wireless local area networks (WLAN), wireless local subscriber loops (WLL), mobile telephony, electronic funds transfer, integrated home systems, communications in transportation vehicles, cable television and multimedia services on cabled networks, etc.

PRIOR ART

The invention relates to the spread spectrum technique. It is known that this technique consists of modulating a digital symbol by a pseudorandom sequence known to the user and the emission of said modulated symbol. Each sequence is formed from N elements known as chips, whose duration is the Nth of the duration of a symbol. This leads to a signal, whose spectrum is spread over a range N times wider than that of the original signal. On reception, a demodulation takes place by correlating the signal received with the sequence used on emission, which makes it possible to reconstitute the starting symbol.

This technique has numerous advantages:

- discretion, because the power of the emitted signal is constant and distributed in a band N times wider, the spectral power density being reduced by a factor N;
- immunity to (spurious or intended) narrow band emissions, the correlation operation at the receiver leading to the spread spectrum of these emissions;
- difficulty of interception (for conventional signal-to-noise ratios), because demodulation requires the knowledge of the sequence used on emission;
- resistance to multiple paths which, under certain conditions, give rise to selective frequency fading and therefore only partly affect the emitted signal;
- possibility of code division multiple access (CDMA), several spread spectrum links by direct sequence being able to share the same frequency band using orthogonal spread codes.

However, this technique suffers from a disadvantage constituted by its limited spectral efficiency. This means the ratio between the binary data rate and the width of the occupied band. If each data symbol contains m bits, the binary data rate is equal to m times the symbol rate, i.e. mDs. With regards to the occupied band, it is equal to double the chip frequency, i.e. 2N times the symbol rate, i.e. 2NDs. Thus, finally, there is a spectral efficiency equal to the ratio $$\frac{mDs}{2NDs},$$

i.e.

$$\frac{m}{2N}.$$

Consideration could be given to an increase in the spectral efficiency by decreasing N, but this would be in opposition to the qualities inherent in the spread and would in particular prejudice the immunity of transmissions to interference. Consideration could also be given to increasing the symbol rate, but the interference phenomenon between symbols would be aggravated.

Another solution consists of increasing m, the number of binary data per symbol, which leads to the use of complex modulations such as phase shift keying (PSK) with several phase states, which is a phase modulation (or coding) or the so-called "M-ary Orthogonal Keying" (MOK) or order M orthogonal modulation.

A description of these modulations appears in two general works:

Andrew J. VITERBI : "CDMA-Principles of Spread Spectrum Communication" Addison-Wesley Wireless Communication Series, 1975, John G. PROAKIS : "Digital Communications McGraw-Hill International Editions, 3rd edition, 1995.

Firstly with respect to phase modulation, it is pointed out that this is more usually a binary modulation or BPSK or quaternary modulation or QPSK. In the first case it is possible to encode symbols with one bit (m=1) and in the second case symbols with two bits (m=2).

These modulations are more usually implemented in differential form (DBPSK, DQPSK) ensuring a good robustness in difficult channels, because no phase recovery loop is necessary. This differential form is also very suitable for processing the multiplicity of propagation paths.

On reception, a differential demodulator carries out the multiplication between the signal to be demodulated and its version delayed by a symbol period. In the case of quaternary modulation use is made of two signal channels, one channel processing the component of the signal in phase with a carrier and another channel which processes the component in quadrature with the carrier.

In the case of MOK modulation, it constitutes a technique in which with each symbol to be emitted is associated a signal taken from among a group of orthogonal signals. These signals can be spread codes of a same family of orthogonal codes. In this case, the modulation also implements the spread. However, these signals may also not be perfectly orthogonal and in this case the performance characteristics are less satisfactory.

If a symbol is constituted by m bits, there are two m possible configurations for the symbols. The number M of available codes must therefore be at least equal to M, with $M=2^m$ If the length of the codes is N, it is known that it is possible to find N orthogonal codes.

Thus, we obtain M=N and the number of bits per symbol is consequently limited to $\log_2 N$. A known MOK receiver is illustrated in the attached FIG. 1, where it is possible to see a bank of matched filters $10^1$, $10_2$, . . . , $10^M$, followed by the same number of samplers $12_1$, $12_2$, . . . , $12_M$, circuits $14_1$, $14_2$, . . . , $14_M$ for determining the energy (or amplitude) of the sampled signal, a circuit 16 for determining the highest energy (or highest amplitude) signal and which delivers the number of the channel corresponding to said signal and finally a circuit 18 which, on the basis of the number of said channel, restores the corresponding code, i.e. the transmitted symbol S.

The MOK technique has a variant called MBOK ("M-ary Bi-Orthogonal Keying") consisting of adding to the set of orthogonal signals used in a MOK modulation their opposites in order to constitute a set of 2M signals, which are obviously not all orthogonal to one another. Demodulation uses M correlators, each adapted to M orthogonal codes, but also requires sign recovery means.

If, for increasing the spectral efficiency, there is an-increase by one unit of the number m of bits in each symbol, the number M of available codes doubles, which multiplies by 2 by the number of channels of the receiver. Thus, the complexity increases much more rapidly than the spectral efficiency, so that this technique has certain limits.

MOK and MBOK modulations are used in certain digital communications systems, in conjunction with a coherent reception structure, which requires the knowledge of the phase of the carrier. The emission of a preamble, prior to the emission of the useful data, is a standard process permitting the estimation of said phase. However, in channels subject to fading and/or multiple path, the phase of the Carrier undergoes variations, which can be very fast and which the reception system must detect and compensate. This is generally obtained by the periodic emission of preambles, which then occupy the channel and lead to a reduction in the useful data rate. In accordance with this diagram, the durations of the preamble and the useful data packet must be less than the channel coherence time (time during which the channel is considered to be stationary). Moreover, there is an increase in the complexity of the reception structure.

Therefore the expert prefers to use non-coherent demodulation diagrams or diagrams which are differentially coherent, which do not require the knowledge of phase information. These techniques avoid the need for long preambles, for phase estimators and for phase derotators, at the cost of a slight sensitivity loss. Moreover, non-coherent demodulation very significantly simplifies the processing of the multiplicity of propagation paths, because each path has inter alia its own phase (and therefore would not require its own phase estimator in a coherent diagram).

French patent application 98 11564 filed on Sep. 16, 1998 by the present applicant proposes a mixed modulation-demodulation digital transmission process combining the MOK technique and the DPSK technique. According to this document, the following procedure is adopted:

A) on emission:
  the binary data to be transmitted are grouped in m data symbols,
  the m data of each symbol are divided into a first subgroup of $m=m_{MOK}$ data and a second subgroup of $M_{DPSK}$ data (i.e. giving $m=m_{MOK}+_{PSK}$),
  with the $m_{MOK}$ data of the first subgroup is made to correspond a code $C_i$ taken from within a group of M orthogonal spread codes,
  the $m_{PSK}$ data of the second subgroup are encoded by differential phase modulation,
  there is a frequency spread of the signal differentially modulated in phase by the spread code $C_i$ corresponding to the data of the first subgroup,
  the thus obtained signal is emitted, B) on reception:
  the signal received is subject to M filtering operations matched to the M possible spread codes,
  determination takes place of the matched filtering leading to the strongest filtered signal,
  from it is deduced the spread code $C_i$ used on emission and the corresponding first subgroup of $m_{MOK}$ data is restored,
  the strongest filtered signal is selected, said signal is switched on a demodulation channel and, in the latter, a phase demodulation takes place for restoring the second subgroup of $m_{PSK}$ data,
  the symbol transmitted is reconstituted with the aid of the first and second data subgroups ($m=m_{MOK}+m_{PSK}$).

The attached FIGS. 2 and 3 respectively illustrate an emitter and a receiver implementing this process.

FIG. 2 shows an emitter comprising:
  means 20 for collecting the binary data to be transmitted in symbols with m data,
  means 22 for dividing the m data of each symbol into a first subgroup $23_{MOK}$ of data and a second subgroup $23_{PSK}$ of $m_{PSK}$ data (with $m=m_{MOK}+m_{PSK}$), whereby said means 22 can constitute a serial-parallel converter,
  a conversion circuit 28 receiving the $m_{MOK}$ bits and converting them into an address directed to a code table 30, which comprises a choice of $M=2^{m}{}_{MOK}$ orthogonal (or substantially orthogonal) spread codes and finally a generator 32 of the chosen spread code $C_i$,
  a differential encoding circuit 24 essentially constituted by a logic multiplier and a delay circuit, as well as a PSK modulator 26,
  a spread spectrum circuit 34 working with the code $C_i$ supplied by the generator 32 and applying it to the modulated signal supplied by the modulator 26,
  a radio frequency stage 35 followed by emission means.

the corresponding receiver is shown in FIG. 3 and comprises:
  an input for receiving a signal to be processed r(t),
  M filtering channels each with a filter 40, $40_2$, ..., $40_M$ matched to a spread code $C_i$ taken from a group of M codes,
  M means $41_1$, $41_2$, ..., $41_M$ for calculating the energy (or amplitude) of the output signals of the M filtering channels on a symbol,
  samplers $42_1$, $42_2$, ..., $42_M$,
  selection means 44 connected to the M means $41_1$, $41_2$, ..., $41_M$ and able to determine the highest energy (or highest amplitude) signal and for delivering on an output 44s the number of the channel corresponding to said maximum energy (amplitude),
  switching means 45 connected to the M matched filters across delay circuits $43_1$ $43_2$, ... $43_M$ and having an output 45s, said switching means 45 being able to switch one of their inputs to the output 45s under the control of the channel number delivered by the selection means 44,
  means 46 connected to the first output 44s of the selection means 44 and able to deduce from the number of the channel the corresponding spread code $C_i$ and restore a first subgroup $m_{MOK}$ of data,
  phase differential demodulation means connected to the output 44s of the switching means 45 and incorporating a complex multiplier 52, a phase reversing circuit 54 and a delay circuit 56, said group of circuits carrying the general reference 60, as well as a PSK demodulator 58 delivering a second subgroup $m_{PSK}$ of data.

The data subgroups $M_{MOK}$ and $m_{PKS}$ are then collected for reconstituting the symbol S. In this technique, the number of bits transmitted per symbol is consequently: $m=m_{MOK}+m_{PSK}$.

As stated hereinbefore, the largest family of orthogonal codes of length L contains L codes (it is said that the family is cardinal N=L). However, as stated hereinbefore, the signals may not be perfectly orthogonal and in this case the performance characteristics are less satisfactory. In practice, the increase in the number of codes increases the complexity of the receiver to a very significant extent. This complexity problem imposes a limitation to the number of usable codes. Thus, full advantage is not taken of the increase in the spectral efficiency theoretically permitted by MOK modulation. As N increases this phenomenon becomes more critical and this is typical of the spread spectrum applications when it is wished to have a robust transmission system.

The aim of the present invention is to propose a solution to this problem. To this end, the invention proposes modifications to the receiver described hereinbefore in such a way that said receiver can constitute a receiver module (or elementary receiver), which can be cascaded (or connected in series) with other identical modules. This leads to the formation of a receiver constituted by several modules operating with a number of codes exceeding the number inherent in each module, but without any increase in the complexity of each module. In exemplified manner, a sequence length of L=32 is assumed, which corresponds to a code number N=32.

It is also assumed that there are two DPSK modulation phase states, i.e. $m_{PSK}=2$ (case of QPSK modulation with four phase states).

For a receiver module use is made of a number Nc=8. The maximum number of bits transmitted in a symbol is:

$$n^{max} = m_{MOKmax} + m_{PSK} = \log_2 N + 2 = 5 + 2 = 7$$

The maximum number of bits accessible to a receiver module for one symbol is:

$$n = m_{MOK} m_{PSK} = \log_2 N_c + 2 = 3 + 2 = 5$$

For this example, the number of bits transmitted per symbol as a function of the number of receiver modules is given in the following table, which makes it possible to compare the bit rates and the spectral efficiency.

| Number of cascaded receiver modules | Number of bits transmitted per symbol | Bit rate for a 60 MHz chip frequency | Spectral efficiency for a 2 Mbit/s link |
|---|---|---|---|
| 1 | 5 | 9.3 Mbits/s | 0.115 bit/s/Hz |
| 2 | 6 | 11.2 Mbits/s | 0.138 bit/s/Hz |
| 4 | 7 | 13.1 Mbits/s | 0.161 bit/s/Hz |

The modular character of the receiver according to the invention offers a very great flexibility in the design of a receiver and makes it possible to obtain high bit rates without increasing the complexity of the circuits. In addition, the standard character of the basic module makes it possible to reduce costs and improve fabrication yields.

DESCRIPTION OF THE INVENTION

The receiver module according to the invention uses certain means of the receiver described relative to FIG. 3 and is characterized in that it is modified so as to be cascadable with other similar modules. To this end, the selection means also deliver, on a second output, the maximum energy (or amplitude) value. Moreover, the receiver module comprises supplementary inputs and outputs, with appropriate interconnections within the module, in order to permit cascading. With regards to the inputs, besides the first input receiving the signal to be processed, the module comprises:

a second input connected to the input of said selection means, which thus receive, besides the M signals delivered by the M filtering channels, the signal carried by said (M+1)th channel, a third input connected to the input of said switching means, which thus receives, besides the M signals delivered by the M filtering channels, the signal applied to said third input, a fourth input connected to the input of the means able to deduce the corresponding spread code from a channel number.

The supplementary outputs comprise:

a first output connected to the first input across a delay means, a second output connected to the second output of the selection means delivering the maximum selected energy (or amplitude) value, a third output, connected across a delay means, to the output of the switching means, a fourth output connected to the first output of the selection means delivering the number of the channel having the maximum energy (amplitude).

In addition, the module has the inputs and outputs necessary for the exchange of control signals, particularly for the mutual synchronization of the modules.

The present invention also relates to a receiver constituted by a plurality (at least 2) such receiver modules. Each receiver module operates with a group of M particular codes, the first, second and third inputs of a receiver module of rank or order i being connected to the first, second and third corresponding outputs of the receiver module of the directly lower rank or order (i−1). The final receiver module fulfills a particular function and is known as the master module, said master module receiving on its fourth input all the code numbers delivered by the fourth outputs of the (n−1) preceding receiver modules, all these numbers forming a global code number. This master module deduces from said global number the corresponding spread code and restores a first subgroup of ($M_{MOK}$) data. The phase demodulation means of said master module receive the last switched signal and carry out demodulation in order to deliver a second group of $m_{PSK}$ data, said master module then reconstructing the transmitted global symbol. The master module also determines the signal or signals necessary for the synchronization of the other modules.

In such a receiver, the phase demodulation means of the (n−1) of the receiver modules preceding the master module are not used.

DETAILED DESCRIPTION OF EMBODIMENTS

Figure 1:
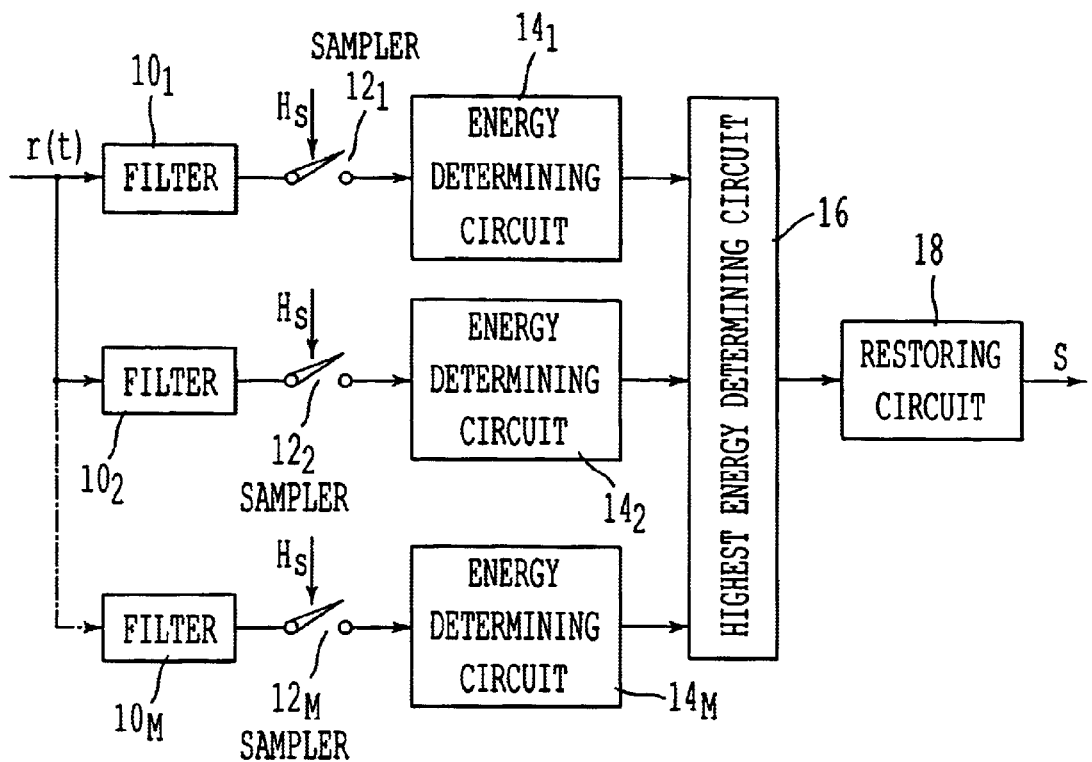
FIG. 1, already described, illustrates a MOK receiver.
Figure 2:
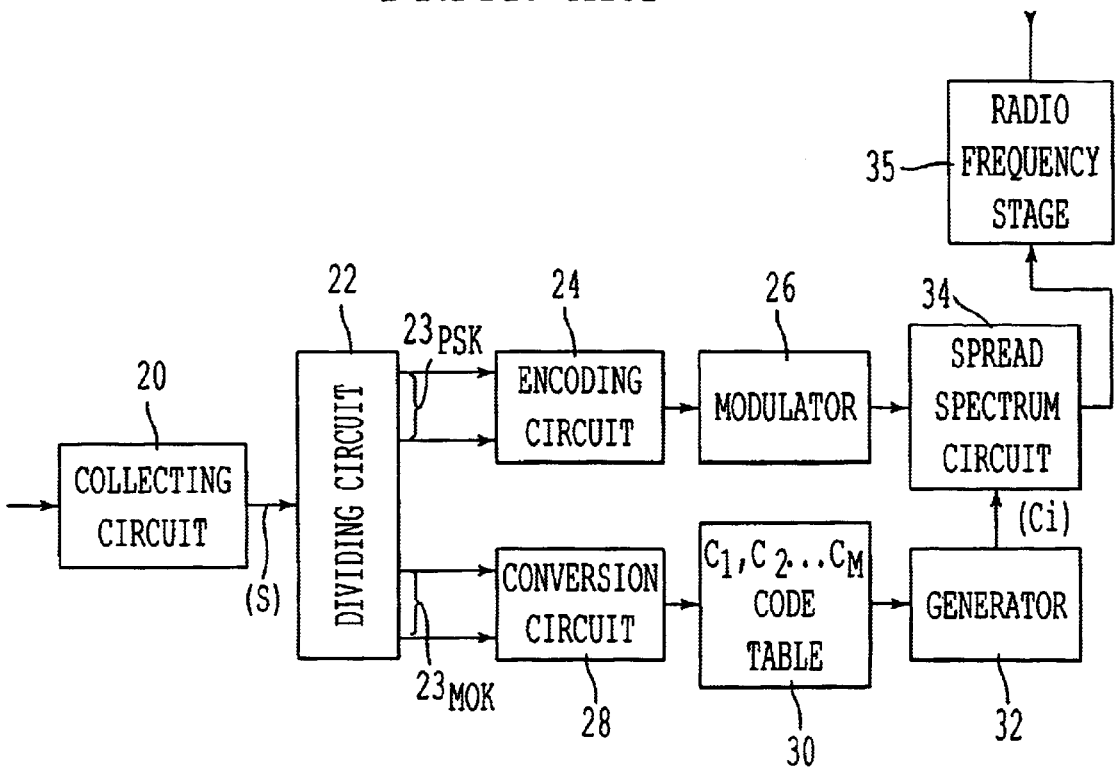
FIG. 2, already described, is a diagram of a MOK-DPSK emitter.
Figure 3:
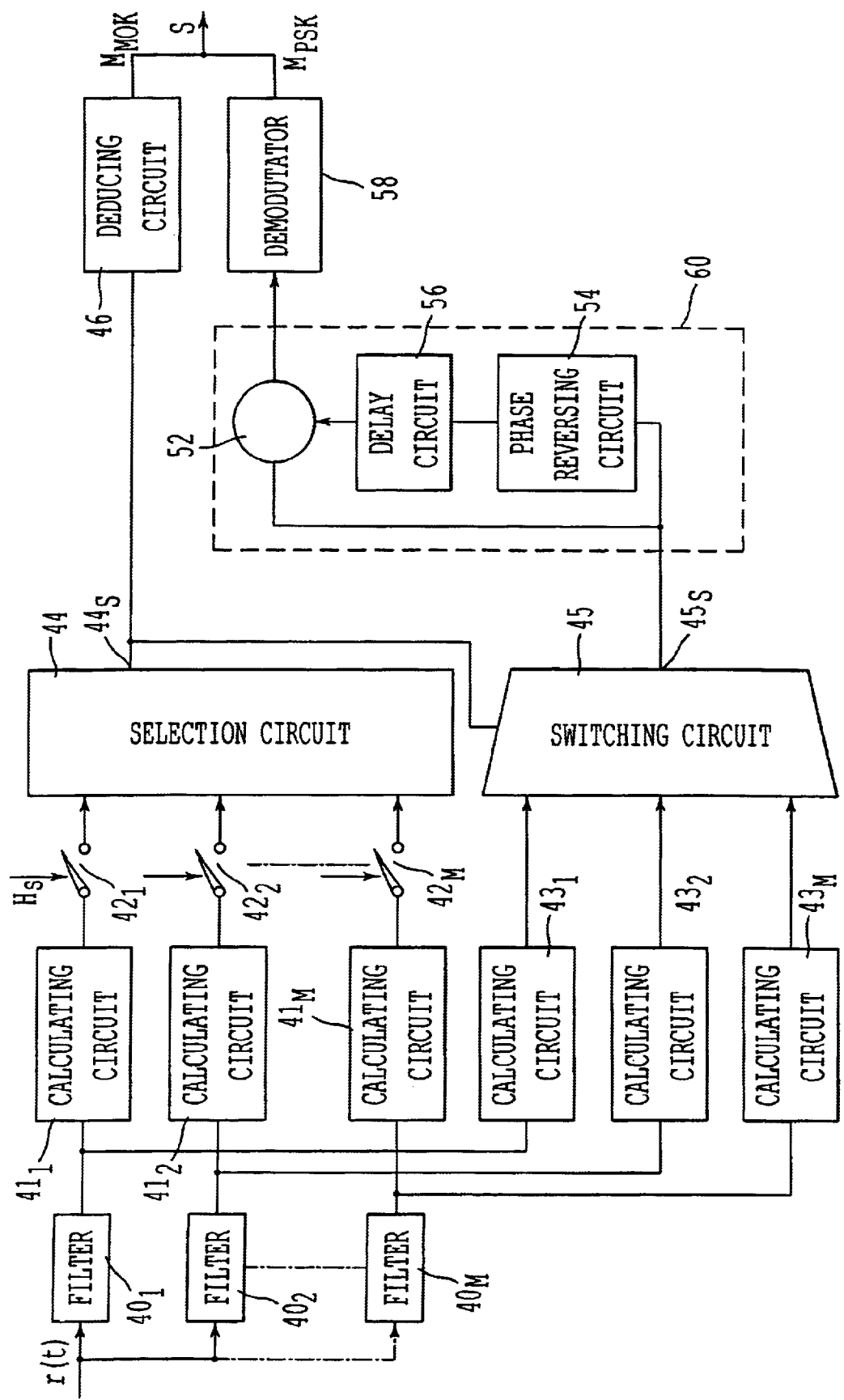
FIG. 3, already described, is a diagram of a corresponding receiver.
Figure 4:
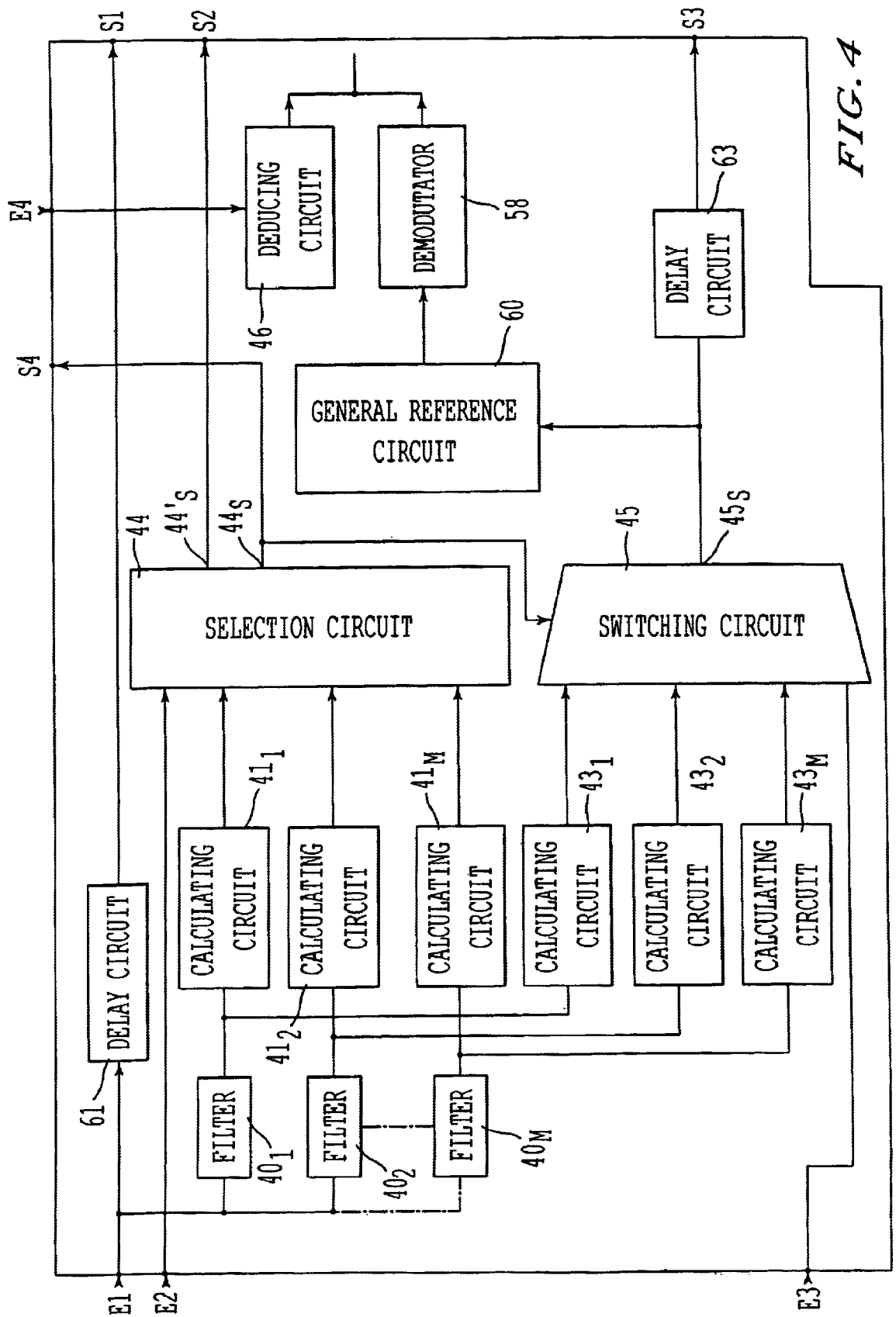
FIG. 4 illustrates a receiver module according to the invention.

The receiver module shown in FIG. 4 comprises means already shown in FIG. 3 and which carry the same references, namely the matched filters $40_1$, $40_2$, ..., $40_M$, the selection means 44, the switching means 45, the decoding means 46 and the demodulation means 58, 60. For simplification reasons, the samplers $42_1$, $42_2$, ..., $42_M$ are not shown.

The module shown comprises four inputs E1, E2, E3 and E4 and four outputs S1, S2, S3 and S4. The input E1 is connected to the output S1 across a delay means 61. The input E2 is connected to the input of the selection means 44. The output 45s of the switching means 45 is connected to the output S3 across a delay means 63. The selection means 44 comprises a second output 44's, which delivers the energy (or amplitude) of the highest energy signal. This second output 44's is connected to the output S2.

The signals applied to the inputs of such a module are as follows:

to E1: input signal to be processed,
to E2: maximum value of the energy (or amplitude) found in the preceding receiver module, or zero if it is the first module,
to E3: switched signal delivered by the preceding module or zero if it is the first module,
to E4: number (or index) of the channel corresponding to the maximum energy (or amplitude) signal.

The signals delivered by the outputs are as follows:

by S1 delayed signal to be processed intended for the following receiver module,
by S2: maximum energy (or amplitude) value found in the receiver module,
by S3: switched signal corresponding to the maximum energy (or amplitude),
by S4: number (or index) of the channel corresponding to the maximum energy (amplitude) switched signal.

This receiver module functions in the following way.

The selection means 44 compare the energies of the M+1 signals, namely the energies of M output signals of M matched filters and the value of the energy applied to the second input E2 of the module and corresponding to the highest energy from the receiver module of the preceding rank (or zero if it is the first module). Two cases can be envisaged:

if the highest energy signal is one of the M filtered signals, the selection means 44 normally deliver the maximum energy value and the number of the corresponding channel, whilst the switching means 45 deliver the corresponding switched signal to the third output S3, if the maximum value is that corresponding to the signal applied to the second input E2, i.e. to the signal from the preceding module, then the switching means 45 directly transmit the signal applied to the third input E3 to the third output S3, said signal consequently passing from a receiver module of rank i−1 to the receiver module of rank i+1.

If the receiver module is the sole module (a zero signal being applied to the inputs E2 and E3), the demodulation means 58-60 function normally and the module delivers the reconstructed symbol $m_{MOK}+m_{PSK}$. If the receiver module is followed by other modules, said reconstruction is transferred to the final module (master module) and the demodulation means 58-60 are not used.

Figure 5:
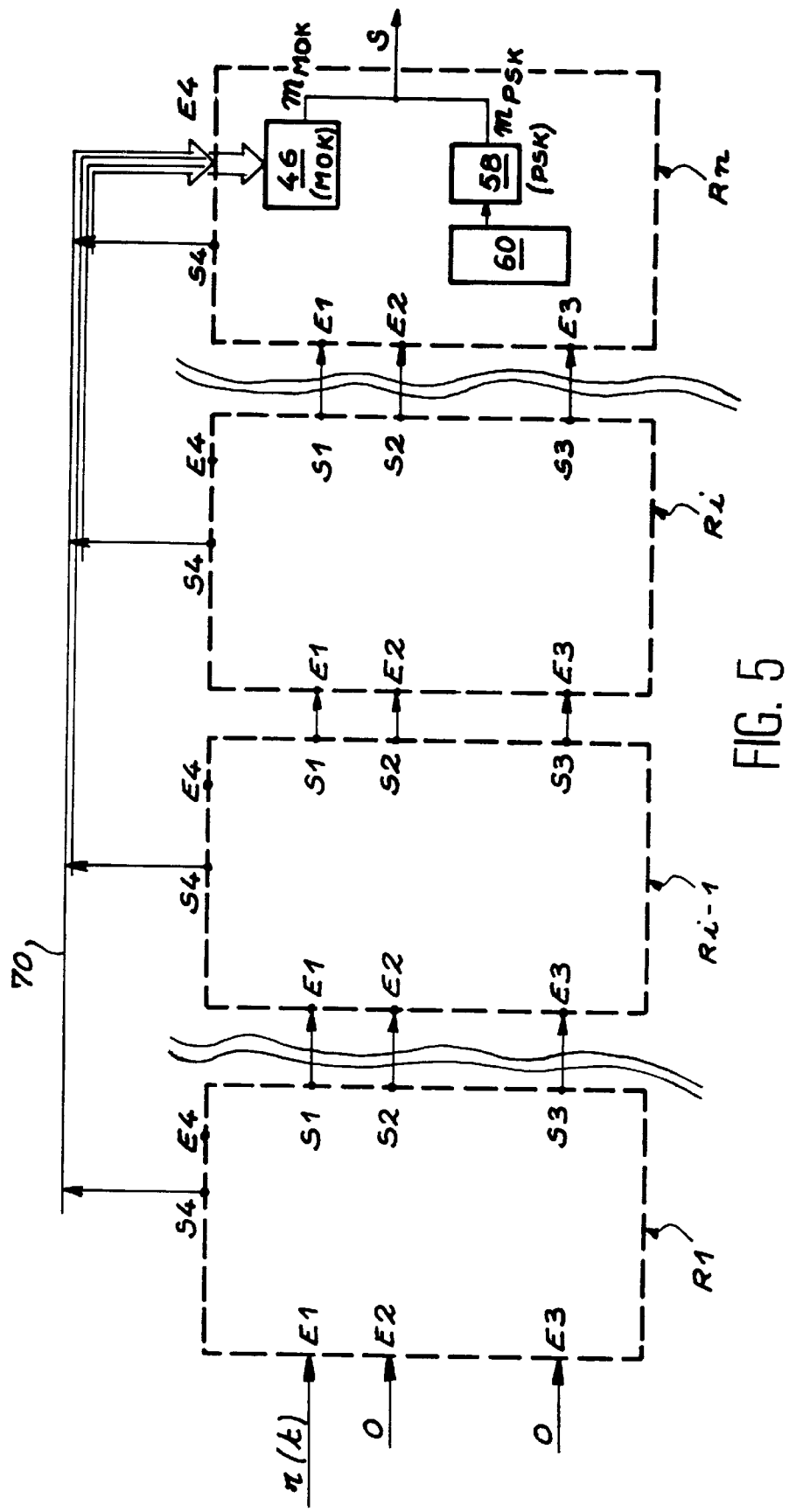
FIG. 5 shows a receiver constituted by several cascaded receiver modules.

FIG. 5 illustrates a receiver formed from a plurality of n modules $R_1, \ldots, R_{i-1}, R_i, \ldots, R_n$, which are cascaded. The inputs E1, E2, E3 of a module $R_i$ of rank i are connected to the outputs S1, S2, S3 of the preceding module $R_{i-1}$ of rank i−1. The outputs S4 of each module are connected to the input E4 of the final module R by a connection 70. These outputs deliver the numbers of the channels and said numbers constitute a global number as from which the means 46 of the final module $R_n$ restore the data subgroup $$m_{M_OK}.$$

The demodulation means 58, 60 of said final module restore the data subgroup $m_{DPSK}$. These two subgroups enable the master module $R_n$ to reconstruct the symbol S.

What is claimed is:

1. Receiver module for differential phase modulation and M order orthogonal modulation spread spectrum digital transmission, said receiver module comprising:

a first input (E1) for receiving a signal to be processed (r(t)),

M filtering channels, each with a filter ($40_1, 40_2, \ldots, 40_M$) matched to a spread code ($C_i$) taken from within a group of M codes, M means ($41_1, 41_2, \ldots, 41_M$) for calculating the energy (or amplitude) of the output signals of the M filtering channels on a symbol, selection means (44) connected to the M energy (amplitude) calculating means, said selection means (44) being able to determine the highest energy (or amplitude) signal and for delivering on a first output (44s) the number of the channel corresponding to said maximum energy (amplitude), switching means (45) connected to M matched filters across M delay circuits ($43_1, 43_2, \ldots, 43_M$) and having an output (45s), said switching means (45) being able to switch one of its inputs to the output (45d) under the control of the channel number delivered by the selection means (44), means (46) connected to the first output (44s) of the selection means (44) and able to deduce from the number of the channel the corresponding spread code ($C_i$) and to restore a first data subgroup ($m_{MOK}$), phase differential demodulation means (58, 60) connected to the output (44s) of the switching means (45) and able to restore a second data subgroup ($m_{PSK}$), said receiver module being characterized in that:

a) the selection means (44) also deliver to a second output (44's) the selected maximum energy (or amplitude) value, b) it comprises supplementary inputs and outputs permitting the cascading of several such receiver modules, i) the supplementary inputs comprising:

a second input (E2) connected to the input of said selection means (44), which consequently receive, besides the M signals delivered by the M filtering channels, the signal carried by said (M+1)th channel, a third input (E3) connected to the input of said switching means (45), which consequently receive, besides the M signals delivered by the M filtering channels, the signal applied to said third input (E3), a fourth input (E4) connected to the input of the means (46) able to deduce from a channel number the corresponding spread code ($C_u$), ii) the supplementary outputs comprising:

a first output (S1) connected to the first input (E1) across a delay means (61), a second output (S2) connected to the second output (44s) of the selection means (44) delivering the selected maximum energy (or amplitude) value, a third output (S3) connected, across a delay means (63), to the output (45s) of the switching means (45), a fourth output (S4) connected to the first output (44s) of the selection means (44) delivering the number of the channel having the maximum energy (amplitude).

2. Receiver for differential phase modulation and orthogonal modulation digital transmission, characterized in that it comprises a plurality of receiver modules ($R_1, \ldots, R_{i-1}, \ldots, R_n$) in accordance with claim 1, said modules being cascaded, each of said n receiver modules working with a group of M particular codes, the inputs (E1, E2, E3) of a receiver module of rank i being connected to the corresponding outputs (S1, S2, S3) of the receiver module of rank (i−1), the final receiver module of rank n ($R_n$) fulfilling a particular function and being called the master module, said master module receiving on its fourth input (E4) all the numbers of channels delivered by the fourth outputs (S4) of the (n−1) preceding receiver modules, all said numbers forming a global number, the second means (46) of said master module ($R_n$) deducing from said global number the corresponding spread code and restoring a first data subgroup ($m_{MOK}$), the fourth phase demodulation means (58, 60) of said master module receiving the final switched signal and performing demodulation in order to deliver a second data subgroup ($m_{DPSK}$), said master module ($R_n$) then reconstructing the transmitted global system, said receiver being also characterized in that the fourth demodulation means of the (n−1) receiver modules preceding the master module ($R_n$) are not used.

3. Receiver according to claim 2, wherein, in each receiver module of rank i ($R_i$), the selection means (44) compare the energies of M+1 signals, namely the energies of M output signals of M matched filters and the value of the energy applied to the second input (E2) of the module and corresponding to the highest energy from the receiver module of the preceding rank, said selection means functioning in the following way:

if the highest energy signal is one of the M filtered signals, said selection means (44) normally deliver the maximum energy value and the number of the channel, and the switching means (45) deliver the corresponding switched signal to the third output (S3), if the maximum value is that corresponding to the signal applied to the second input (E2), i.e. to the signal from the preceding module ($R_i-_{1-1}$), then said switching means (45) transmit the signal applied to the third input (E3) directly to the third output (S3), said signal consequently passing from the receiver module of rank i−1 ($R_{i-1}$) to the receiver module of rank i+1($R_{i-1}$).

* * * * *